(12) United States Patent
Stähli n et al.

(10) Patent No.: US 9,911,333 B2
(45) Date of Patent: Mar. 6, 2018

(54) METHOD FOR CLASSIFYING A RECEIVED VEHICLE-TO-X MESSAGE

(71) Applicant: Continental Teves AG & Co. oHG, Frankfurt (DE)

(72) Inventors: Ulrich Stähli n, Eschborn (DE); Richard Scherping, Liederbach am Taunus (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/102,631

(22) PCT Filed: Dec. 4, 2014

(86) PCT No.: PCT/EP2014/076571
§ 371 (c)(1),
(2) Date: Jun. 8, 2016

(87) PCT Pub. No.: WO2015/090999
PCT Pub. Date: Jun. 25, 2015

(65) Prior Publication Data
US 2016/0328972 A1     Nov. 10, 2016

(30) Foreign Application Priority Data
Dec. 18, 2013   (DE) .................. 10 2013 226 530

(51) Int. Cl.
*G08G 1/00*     (2006.01)
*G08G 1/16*     (2006.01)
(Continued)

(52) U.S. Cl.
CPC ........... *G08G 1/163* (2013.01); *B60W 30/095* (2013.01); *G08G 1/096791* (2013.01);
(Continued)

(58) Field of Classification Search
CPC ....... G08G 1/161; H04L 67/00; B60W 30/095
(Continued)

(56) References Cited

U.S. PATENT DOCUMENTS 8,451,812 B2    5/2013   Stahlin
8,897,997 B2 *  11/2014  Firl ..................... G08G 1/0112
                                                          701/117
(Continued)

FOREIGN PATENT DOCUMENTS

DE     102008060231    6/2009
DE     102008055932    5/2010
(Continued)

OTHER PUBLICATIONS

German Search Report for German Application No. 10 2013 226 530.1 dated Oct. 31, 2014, including partial translation.
(Continued)

*Primary Examiner* — Phung Nguyen
(74) *Attorney, Agent, or Firm* — RatnerPrestia

(57) ABSTRACT

A method for classifying a received vehicle-to-X message, wherein the vehicle-to-X message is sent by a sender and received by a receiver that performs the classification, wherein the vehicle-to-X message contains first information regarding the sender, and wherein first information regarding the receiver is sensorially determined, wherein a sender region is determined from the first information regarding the sender, and a receiver region is determined from the first information regarding the receiver, and the classification is determined according to an overlapping of the sender region and the receiver region.

19 Claims, 2 Drawing Sheets

(51) Int. Cl.
  *B60W 30/095* (2012.01)
  *H04W 4/02* (2018.01)
  *H04L 29/08* (2006.01)
  *G08G 1/0967* (2006.01)

(52) U.S. Cl.
  CPC .............. *H04L 67/12* (2013.01); *H04L 67/18* (2013.01); *H04W 4/023* (2013.01); *B60W 2550/40* (2013.01); *B60W 2550/408* (2013.01); *B60W 2720/14* (2013.01)

(58) Field of Classification Search
  USPC .............................. 340/902, 933, 426.19, 435
  See application file for complete search history.

(56) References Cited

U.S. PATENT DOCUMENTS

| | | | |
|---|---|---|---|
| 8,922,390 B2 | 12/2014 | Stahlin | |
| 2013/0058536 A1* | 3/2013 | Levin | A61B 5/18 |
| | | | 382/104 |
| 2014/0020098 A1 | 1/2014 | Stahlin | |
| 2014/0140353 A1 | 5/2014 | Stahlin | |
| 2015/0005981 A1* | 1/2015 | Grimm | G07C 5/008 |
| | | | 701/1 |
| 2016/0293394 A1* | 10/2016 | Duncan | H01J 49/0031 |

FOREIGN PATENT DOCUMENTS

| | | |
|---|---|---|
| DE | 102010002092 | 12/2010 |
| DE | 102010038640 | 2/2012 |
| DE | 102012204880 | 10/2012 |
| DE | 102011101359 | 11/2012 |
| DE | 102011107111 | 1/2013 |
| DE | 102011080922 | 2/2013 |
| WO | 03077223 | 9/2003 |

OTHER PUBLICATIONS

Intelligent Transport Systems (ITS); Vehicular Communications; Basic Set of Applications; Part 1, pp. 1-54, V1.2.0, Specifications of Decentralized Environmental Notification Basic Service [retrieved Dec. 4, 2013].

Intelligent Transport Systems (ITS); Vehicular Communications; Basic Set of Applications; Part 2, pp. 55-62, V1.2.0, Specifications of Decentralized Environmental Notification Basic Service [retrieved Dec. 4, 2013].

International Search Report and Written Opinion of the International Searching Authority for International Application No. PCT/EP2014/076571 dated Feb. 5, 2015.

Schedel, J., et al., Kollisionserkennung; https://www12.informatik.unierlangen.de/edu/robertino/vortrag_robertino.pdf, dated Jun. 22, 2005, 39 pages.

* cited by examiner

METHOD FOR CLASSIFYING A RECEIVED VEHICLE-TO-X MESSAGE

CROSS REFERENCE TO RELATED APPLICATIONS

This application is the U.S. National Phase Application of PCT International Application No. PCT/EP2014/076571, filed Dec. 4, 2014, which claims priority to German Patent Application No. 10 2013 226 530.1, filed Dec. 18, 2013, the contents of such applications being incorporated by reference herein.

FIELD OF THE INVENTION

The invention relates to a method for classifying a received vehicle-to-X message.

BACKGROUND OF THE INVENTION

Vehicle-to-X communication systems which are suitable for information transmission both between different vehicles (vehicle-to-vehicle communication) and between vehicles and infrastructure installations (vehicle-to-infrastructure communication) are already known in the prior art. Both variants are usually grouped under the generic term vehicle-to-X communication. Owing to the high density of vehicle-to-X messages occurring especially in urban traffic areas and the associated high information density, there are already known filter processes that classify the received vehicle-to-X messages into relevant information to be processed by the recipient and irrelevant information to be discarded.

DE 10 2010 038 640 A1, which is incorporated by reference describes in this connection a device and a method for vehicle-to-X communication. The disclosed method is based on a combination of communication technologies, each of which is different and has different properties. A first communication channel can be implemented e.g. as a mobile communication channel, whereas a second communication channel is implemented as a WLAN channel. Which type of information is sent over which communication channel is determined by originator-based sorting of the information to be sent. According to DE 10 2010 038 640 A1, periodically occurring or static information is transmitted over the first channel, whereas safety-relevant information is transmitted over the second channel. DE 10 2008 060 231 A1, which is incorporated by reference describes a method for selecting various data transmitted by means of vehicle-to-X communication. The various data received are classified by a data filter in the receiver on the basis of a data frame and forwarded, for example, to a driver assistance system or an entertainment unit. This allows the received data to be sorted before actually being processed.

DE 10 2010 002 092 A1, which is incorporated by reference describes data preprocessing for received vehicle-to-X messages, which preprocessing precedes forwarding of the messages to the associated applications and systems in the vehicle and processing of same by these applications and systems. Said data preprocessing can comprise checking an integrity level of the message and additionally performing data reduction. The data reduction causes information about certain objects or situations to be suppressed and hence said information is not forwarded and processed. Thus, for instance, information about objects located too far from the receiving vehicle or information about objects that are only reached by the vehicle after a certain period of time, is ignored. Likewise, a large number of spatially close objects having fundamentally the same response to a situation are combined e.g. into a traffic jam. It is also possible to take account solely of objects located in the intended channel of movement of the vehicle. The amount of data to be processed by the individual applications can thereby be reduced.

DE 10 2012 204 880 A1, which is incorporated by reference describes a method for reducing the computational load in a data integrity check of data packets received by means of vehicle-to-X communication. The data integrity check here consists of checking a signature encrypted using cryptographic algorithms, which check is associated with a large amount of computing power and requires the use of dedicated electronics. In order to reduce the computational load, the received vehicle-to-X messages are first preprocessed to prioritize said messages under different categories. This prioritization can be performed using different criteria, such as, for instance, the distance of the originator from the recipient, or the TTC (time to collision) of the originator to the recipient. First only the signatures of data packets assigned a high priority are checked. If subsequently there is still spare computing capacity available, further data packets are checked. This document also describes the option of using surround sensor data to verify the content of a data packet and thereby being able to dispense with checking the signature.

SUMMARY OF THE INVENTION

The methods known from the prior art, however, have the disadvantage that they use relatively inflexible criteria while in particular expending a comparatively large amount of computing power to classify the vehicle-to-X messages to be analyzed.

An aspect of the present invention proposes an improved classification method for received vehicle-to-X messages.

An aspect of the invention relates to a method for classifying a received vehicle-to-X message, wherein the vehicle-to-X message is transmitted by an originator and is received by a recipient performing the classification, wherein the vehicle-to-X message contains first information of the originator, wherein first information of the recipient is determined using sensors, wherein an originator region is determined from the first information of the originator, and a recipient region is determined from the first information of the recipient, and wherein the classification is determined on the basis of an overlap of the originator region with the recipient region. This achieves the advantage that in particular compared with what are known as probabilistic techniques, it is possible to classify the received vehicle-to-X messages on the basis of the first information relatively efficiently in terms of computing time. In addition, the classification is more precise and reliable in comparison with pure distance-based classification techniques, which make the classification substantially dependent on the spatial distance of the originator from the recipient. In turn, this comparatively greater reliability consequently results in the recipient classifying in total a smaller number of received vehicle-to-X messages as relevant by means of the method according to the invention, because the classification as described is in comparison more reliable, and hence even vehicle-to-X messages that cannot be classified unequivocally are not classified for safety's sake, as a precaution, as relevant within a classification tolerance range. Hence in addition this also reduces the required computing capacity that must be kept in reserve for reliable analysis at all times of the vehicle-to-X messages classified as relevant.

The originator region is a spatial region in which the originator will be located with a relatively very high probability within a specified time interval, i.e. there is a relatively very high probability that the originator will not leave the originator region within the specified time interval.

The recipient region is a spatial region in which the recipient will be located with a relatively very high probability within a specified time interval, i.e. there is a relatively very high probability that the recipient will not leave the recipient region within the specified time interval.

The greater the overlap, or the greater the overlap to be expected within a specified time interval, of the originator region with the recipient region, the more relevant the received vehicle-to-X messages may be classified by the recipient. If absolutely no overlap exists or is expected, the vehicle-to-X message can be classified as irrelevant, for instance.

It is advantageous that the vehicle-to-X message is a Cooperative Awareness Message (CAM). This class of messages is usually transmitted periodically, in particular at frequencies of 10 Hz, by an originator and contains a set of information about the status of the originator.

It is advantageous that the vehicle-to-X message is transmitted and received by means of at least one of the following connection types:
  WLAN connection, in particular in compliance with IEEE 802.11p;
  ISM connection (Industrial, Scientific, Medical band);
  Bluetooth® connection;
  ZigBee connection;
  UWB connection (Ultra Wide Band);
  WiMax® connection (Worldwide Interoperability for Microwave Access);
  infrared connection; and
  mobile communications connection.

These connection types offer various advantages here depending on the form, wavelength and data protocol used. Thus some of the listed connection types enable e.g. a relatively high data transmission rate and allow a connection to be established relatively quickly, whereas others are by far the best suited to data transmission around line-of-sight obstructions. Further advantages can be achieved by combining and using simultaneously or in parallel a plurality of these connection types, because this can also compensate for disadvantages of individual connection types.

In addition, preferably both the originator and the recipient are vehicles, in particular motor vehicles.

The first information advantageously comprises a position, an orientation and a velocity. The first information can hence be used to estimate a region in which the recipient or the originator will be located with a certain probability within a certain time interval. The position can be determined here, for example, using a GNSS system such as GPS or Galileo. Map-matching techniques or dead-reckoning navigation methods (separately or in any combination) are also possible, however. In addition, it is then possible to determine the velocity by differentiating the position with respect to time, and to determine the orientation from the direction of the velocity.

For the purpose of the invention, the orientation denotes a direction of the originator, i.e. the direction of a velocity vector of the originator.

It is advantageous that the first information of the originator is read by a network layer of a vehicle-to-X communication system of the recipient. This type of approach is actually especially advantageous in particular when processing received CAMs. The first information of the originator is thereby already available in the network layer of the vehicle-to-X communication system immediately after the vehicle-to-X message is physically received by a suitable antenna element of the recipient. The first information of the originator is hence available to the recipient directly and without a time delay and need not be forwarded initially for analysis to higher protocol layers of the vehicle-to-X communication system.

Preferably, second information of the originator is calculated from the first information of the originator, and second information of the recipient is calculated from the first information of the recipient and/or second information of the recipient is determined using sensors. Hence additional information is available, which can be used, for example, for additionally specifying properties or the behavior of the originator or recipient. Said determination of the second information using sensors is preferably performed by means of sensors that are typically present in a motor vehicle, such as ESC sensors, for instance, in the form of accelerometers, steering-angle sensors, yaw rate sensors and/or wheel speed sensors, or even surround sensors in the form of camera sensors, radar sensors, ultrasound sensors and/or LiDAR sensors. Said determination of the second information of the originator from the first information of the originator, which first information is contained in the received vehicle-to-X message, is preferably performed by higher protocol layers of the vehicle-to-X communication system of the recipient. Thus this means that the network layer of the vehicle-to-X communication system of the recipient forwards the received vehicle-to-X message to the higher protocol layers, where the information contained in the vehicle-to-X message is processed further and/or analyzed.

Particularly preferably, the second information of the originator is additionally used to determine the originator region, and/or the second information of the recipient is additionally used to determine the recipient region. Hence there is more information available overall for determining the originator region and/or the recipient region, or the second information is used to analyze the first information further to determine the originator region and/or the recipient region. This allows the originator region and/or the recipient region to be determined more reliably and more exactly.

Most preferably, the second information comprises a yaw rate and/or a yaw acceleration and/or a linear acceleration. This information is particularly well-suited to determining the originator region or the recipient region even more safely and reliably. The second information of the originator is here determined as described from the first information of the originator, and the second information of the recipient is determined either from the first information of the recipient or by the recipient using sensors. It is also possible according to the invention to determine the second information of the recipient simultaneously from the first information of the recipient and using sensors.

In particular, it is particularly preferred that an absolute value of the yaw rate of the originator is used to determine the originator region, and/or that an absolute value of the yaw rate of the recipient is used to determine the recipient region. Thus this means that only the magnitude of the yaw rates but not the direction or vector of the yaw rates is used to determine the originator region and/or the recipient region. The originator region and the recipient region thereby fan out. By using solely the magnitude of the yaw rates, the computing power required to implement the method according to the invention in a vehicle-to-X communication system can be reduced advantageously.

In addition, the respective positions of the originator and the recipient are converted into a Cartesian coordinate system, wherein the position of the recipient forms the origin of the coordinate system, and wherein the originator region and the recipient region are determined in the Cartesian coordinate system. This simplifies for the recipient the calculation of the originator region, the recipient region and/or an overlap of the originator region with recipient region. The computing power required can hence be reduced further.

It is also advantageous that for the purpose of determining the originator region, first an originator path starting from the position of the originator is calculated, and for the purpose of determining the recipient region, first a recipient path starting from the position of the recipient is calculated. The originator path here constitutes that path that the originator is expected to travel within the specified time interval, for instance assuming a constant velocity. The originator path is hence advantageously used to determine an extent of the originator region. Similarly, the recipient path here constitutes that path that the recipient is expected to travel within the specified time interval, for instance likewise assuming a constant velocity. The recipient path is hence advantageously used to determine an extent of the recipient region.

Said originator path is calculated particularly advantageously from the velocity of the originator, and said recipient path is calculated particularly advantageously from the velocity of the recipient.

In particular it is advantageous that the originator path is calculated from the first and/or second information of the originator for a time interval, and that the recipient path is calculated from the first and/or second information of the recipient for the time interval, wherein additionally a time error in the first information of the originator and/or a detection error in the first information of the recipient and/or a calculation uncertainty in the second information of the originator and/or of the recipient is taken into account. The originator path and the recipient path are thus calculated for a specified time interval or for a time interval that can be selected according to need or situation. By using in addition to the first information if applicable also the second information for the calculation, and by taking into account additionally time errors and/or detection error and/or calculation uncertainties, the probability that the originator travels in the time interval a path that is longer than the calculated originator path is particularly low. The same applies to the recipient and the recipient path. This makes the method according to the invention particularly reliable. It is most particularly advantageous that the first calculation uncertainty is calculated from the time interval, the velocity and the acceleration. Since the velocity and the acceleration may change over the time interval, it is particularly advantageous to take into account these variables for the calculation uncertainty. The calculation uncertainty can be determined, for example, using known stochastic techniques.

Likewise it is most particularly advantageous that for the purpose of determining the originator region, the originator path is rotated through an originator rotation angle, where the originator rotation angle is calculated from the yaw rate and the yaw acceleration of the originator and from the time interval, and that for the purpose of determining the recipient region, the recipient path is rotated through a recipient rotation angle, where the recipient rotation angle is calculated from the yaw rate and the yaw acceleration of the recipient and from the time interval. The surface swept out by rotating the originator path or recipient path through the originator rotation angle or respectively the recipient rotation angle defines the originator region or respectively the recipient region. Rotating through the originator rotation angle or the recipient rotation angle, and predetermining the originator rotation angle and the recipient rotation angle from the respective yaw rates and yaw accelerations, ensures that due account is also taken of changes in direction and cornering of the originator and of the recipient in determining the originator region and the recipient region. This again increases the reliability of the method according to the invention.

It is also most particularly advantageous that for the purpose of determining the originator region, an originator circle is placed over the originator path, the diameter of which circle equals the originator path, and that for the purpose of determining the recipient region, a recipient circle is placed over the recipient path, the diameter of which circle equals the recipient path. This provides a simple way of determining the originator path and the recipient path that is also efficient in terms of computing time. The originator circle and recipient circle determined in this manner can, for instance, be adopted directly as the originator region and recipient region respectively or else modified further and defined more precisely by additional method steps.

In particular, it is most particularly advantageous that a check is made for an overlap between the originator circle and the recipient circle. Since determining the originator circle and the recipient circle as described is relatively simple and efficient in terms of computing time, it is hence possible to make a first classification quickly and easily, for which a more precise or additional specification can be made subsequently if applicable. If, however, the originator circle does not overlap the recipient circle then additional classification steps can advantageously be omitted because the vehicle-to-X message can be reliably classified already as irrelevant even just on this basis.

Furthermore, it is most particularly advantageous that, if the originator circle overlaps the recipient circle, the originator region is defined more precisely by an originator polygon and the recipient region is defined more precisely by a recipient polygon, wherein a number of sides of the originator polygon is selected on the basis of the yaw rate of the originator, and wherein a number of sides of the recipient polygon is selected on the basis of the yaw rate of the recipient. This achieves the advantage that the first classification established already from the overlap of the originator circle and the recipient circle can be checked further and especially more accurately. Said originator polygon specifies the originator region, and said recipient polygon specifies the recipient region. Since the originator polygon and the recipient polygon are better matched to the behavior of the originator and the recipient respectively through additional computing effort, they can advantageously be used to make a second classification, which provides an additional or more precise specification of the first classification. The classification using the originator polygon and the recipient polygon can also be performed instead of the classification using the originator circle and the recipient circle, however.

In addition, it is particularly advantageous that different originator regions and different recipient regions are determined on the basis of different time intervals. This achieves the advantage that a comparatively finer-graded classification is possible that does not distinguish solely between relevant and irrelevant but also allows intermediate grades.

In addition, it is in particular most particularly advantageous that at least two different time intervals are used as classification thresholds, and the classification is made at least into three categories. A classification into three different categories, e.g. irrelevant, relevant, critical, has proved sufficient for the typical area of use. The classification can be defined even more precisely by adding additional time intervals or classification thresholds, but then the computing power required also increases. The classification is preferably performed such that starting with the maximum time interval or the maximum classification threshold, the originator region and the recipient region are checked for an overlap until no overlap is detected for a classification threshold, or the vehicle-to-X message is ultimately classified as belonging to the critical message group.

In particular, it is particularly advantageous that a hysteresis effect is applied to the time intervals or the classification thresholds for a specific originator or for all the received vehicle-to-X messages from a specific originator. This means that the time intervals or the classification thresholds are adjusted in a specified range on the basis of the classification of the last vehicle-to-X message received from this originator, in order to avoid sudden differences in the classification of successive vehicle-to-X messages from the same originator. The result of this is that two threshold values, e.g. for relevant and critical, become four threshold values, namely: "relevant+hysteresis effect", "relevant−hysteresis effect", "critical+hysteresis effect" and "critical−hysteresis effect".

An order of processing of the received vehicle-to-X messages is preferably made dependent on the classification of said messages. This ensures that the vehicle-to-X messages classified as critical or relevant can be processed quickly and above all reliably, because normally there is still sufficient spare computing capacity available for the vehicle-to-X messages that are to be processed first. The vehicle-to-X messages classified as irrelevant are subsequently processed only if there is still computing capacity available.

BRIEF DESCRIPTION OF THE DRAWINGS

Further preferred embodiments are given in the dependent claims and the following descriptions of exemplary embodiments with reference to figures, in which:

DETAILED DESCRIPTION OF THE PREFERRED EMBODIMENTS

Figure 1:
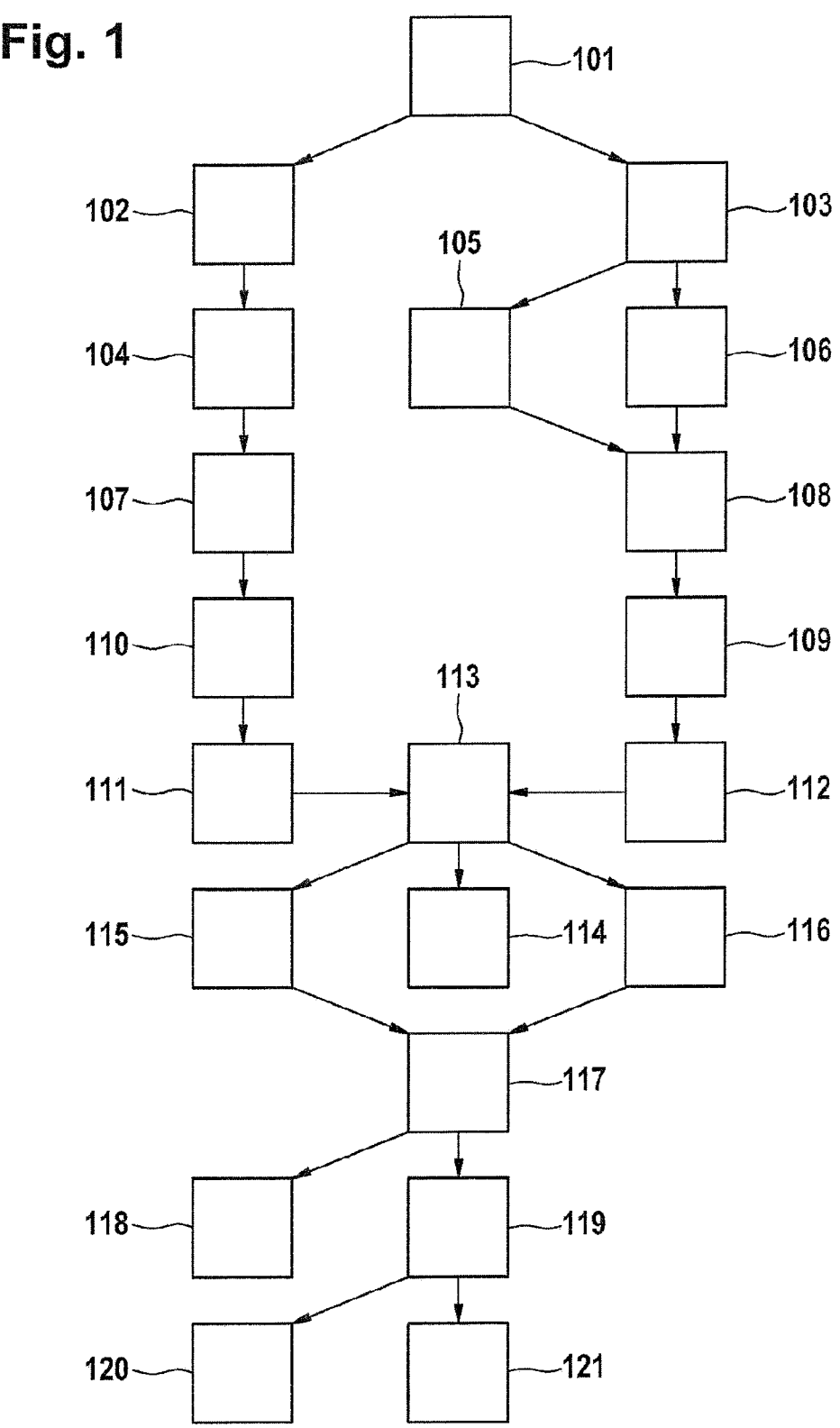
FIG. 1 shows an example sequence of the method according to the invention in the form of a flow diagram.

FIG. 1 shows by way of example a possible sequence of the method according to an aspect of the invention in the form of a flow diagram. In step 101, first a vehicle-to-X message transmitted by an originator is received by a recipient. The vehicle-to-X message is in this case what is known as a CAM message, which is transmitted and received via WLAN in compliance with IEEE 802.11p, and includes, amongst other information, a position, an orientation and a velocity of the originator. The position is specified in GPS coordinates for example. Both the originator and the recipient are motor vehicles, which are each equipped with a vehicle-to-X communication system. The method according to the invention, apart from the transmission of the vehicle-to-X message, is performed here by the recipient. In method step 102, the network layer of the vehicle-to-X communication system of the recipient reads the position, orientation and velocity from the vehicle-to-X message. Thus this information is already available to the recipient immediately after receipt. Parallel in time with step 102, in step 103 sensors present in the recipient are used to determine the position, orientation and velocity of the recipient. For instance if the recipient involves a GPS receiver, the positions obtained by this receiver are improved by an odometry technique that uses wheel speed sensors. In the subsequent method step 104, the recipient determines the yaw rate and the linear acceleration of the originator from the position, orientation and velocity of the originator. These values are determined in one of the higher protocol layers of the vehicle-to-X communication system. In step 105, the recipient determines the yaw rate and the linear acceleration of the recipient from the position, orientation and velocity of the recipient. These values are determined in an electronic control unit provided for this purpose in the recipient. In addition, in step 106, the recipient uses sensors, namely an accelerometer and a yaw rate sensor, to determine the yaw rate and the linear acceleration of the recipient. In step 107, the recipient calculates the originator path. Errors and uncertainties are dealt with mathematically in the same way both for calculating the originator path and for calculating the recipient path, and subsequently the originator region and the recipient region. The velocity, acceleration and yaw rate are hence increased both by their respective errors and by their respective uncertainties, each of which are parameters that must be set. For the yaw rate, it must also be taken into account that for simplification it is considered as an absolute value for example, and as a result, the originator region and the recipient region fan out in two directions. Furthermore, the positions are first converted into a Cartesian coordinate system having origin (0|0) at the location of the recipient.

For example, the originator path is then calculated from the position of the originator as follows:

Taking into account a time error both in the direction of the orientation of the originator and in the opposite direction:

$$v*\Delta t$$

Calculation of the length of the originator path for a specified time interval in the direction of the orientation of the originator:

$$(t*v)+(t^2/2a)$$

where:
v=velocity
Δt=time error
a=linear acceleration
t=time interval

The time error is in this case the timing error, or in other words the maximum possible time variation, in a time updating device of the recipient or the originator. For instance, the time updating device of both the recipient and the originator is in the form of a GPS-based clock.

In step 108, the recipient path is calculated in analogous equations to those just described. In the next step 109, the originator path is then rotated through the originator rotation angle. Said rotation of the originator path is performed about the position of the originator as the center of rotation.

The originator rotation angle is obtained from the following equation, for instance:

$$\alpha=\Delta\psi+(t*d\psi/dt)$$

where:
α=originator rotation angle
Δψ=error in the yaw rate

In step 110, the recipient rotation angle is calculated in an analogous equation to that just described.

In the next step 111, an originator circle of diameter equal to the length of the originator path is superimposed on the region swept out by the originator path. Simultaneously, in step 112, a recipient circle is superimposed on the region swept out by the recipient path. In method step 113, a check is now made for an overlap between the recipient circle and the originator circle. If the recipient circle and the originator circle do not overlap, i.e. there is no overlap between the recipient circle and the originator circle, in step 114 the received vehicle-to-X message is classified as irrelevant. Similarly, the originator is classified as irrelevant to the recipient. If, however, there is an overlap between the recipient circle and the originator circle, then in steps 115 and 116 polygons are determined, which define more precisely the originator region and the recipient region respectively.

First the originator polygon is determined, in method step 115. The number of sides of the originator polygon is here determined on the basis of the yaw rate of the originator or on the basis of the originator rotation angle. Compared with the originator circle and recipient circle, the originator polygon and the recipient polygon take greater account of the driving behavior of the originator and the recipient respectively, thereby resulting in a more meaningful and more reliable classification. The following examples distinguish between three cases:

Case 1: $\alpha < 90$ degrees:
6-sided polygon
    rear right: $(-e|-e)$
    right:$((f+e)*c-e*s|-((f+e)*s+e*c))$
    front right:$(f+e|-((f+e)*s)+((f+e)*(1-c))/(s/c))$
    front left:$(f+e,((+e)*s)-((f+e)*(I-c))/(s/c))$
    left: $((f+e)*c-e*s|((f+e)*s+e*c))$
    rear left: $(-e|e)$ Case 2: 90 degrees $< \alpha < 180$ degrees:
7-sided polygon:
    rear: $(-e|0)$
    rear right:$((f+e)*c-e*s|-((f+e)*s+e*c))$
    right:$((f+e)*c-(f+e)*(1-s)*s/c|-(f+e))$
    front right: $((f+e)|-(f+e))$
    front left: $((f+e)|(f+e))$
    left: $((f+e)*c-(f+e)*(1-s)*s/c|(f+e))$
    rear left:$((f+e)*c-e*s|(f+e)*s+e*c)$ Case 3: $\alpha > 180$ degrees:
4-sided polygon
    rear right: $(-(f+e)|-(f+e))$
    front right: $((f+e)|-(f+e))$
    front left: $((f+e)|(f+e))$
    rear left: $(-(f+e)|(f+e))$ where:
$c = \cos(\alpha)$
$s = \sin(\alpha)$
$f = v*\Delta t + t*v + t^2/2a$
$e$ = error in the position The error in the position is here the error, or in other words the maximum possible position variation, in the position determined by GPS.

The coordinate values are here specified in the Cartesian coordinate system (x|y), where in the calculation of the originator polygon, x points in the direction of travel of the originator. The recipient polygon is determined in method step 116 analogously to determining the originator polygon. In this case, the coordinate x in the Cartesian coordinate system (x|y) points in the direction of travel of the recipient. The yaw rates have been considered in a simplified manner as absolute values, by way of example. According to another exemplary embodiment, however, this is not the case, and the left side and right side of the originator polygon and of the recipient polygon are accordingly handled differently, i.e. the left side and the right side of a polygon are calculated using different yaw rates or rotation angles. Polygons having a maximum of seven sides are still generated however. The subsequent steps therefore remain unchanged.

In the next step 117, a check is now made for an overlap between the originator polygon and the recipient polygon. The check for an overlap is performed here, for example, in accordance with the "polygon collision" technique. If there is no overlap, in step 118 the received vehicle-to-X message is classified as irrelevant. Similarly, the originator is classified as irrelevant to the recipient. If, however, there is an overlap between the originator polygon and the recipient polygon, the method is continued in step 119. In step 119, a new time interval is selected that is shorter than the previously selected time interval. Then in step 119, the originator polygon and the recipient polygon is re-determined for the new time interval that is shorter in comparison. Since the new time interval is shorter than the previously selected time interval, the originator polygon and the recipient polygon are also correspondingly smaller. In addition in step 119, a check is made for an overlap between the originator polygon determined using the shorter time interval and the recipient polygon determined using the shorter time interval. If this is not the case, i.e. if there is no overlap, in step 120 the received vehicle-to-X message is classified as relevant by the recipient. Similarly, in step 120 the originator is classified as relevant by the recipient. If there is an overlap, however, the received vehicle-to-X message and the originator are classified, for example, as critical in step 121.

Figure 2:
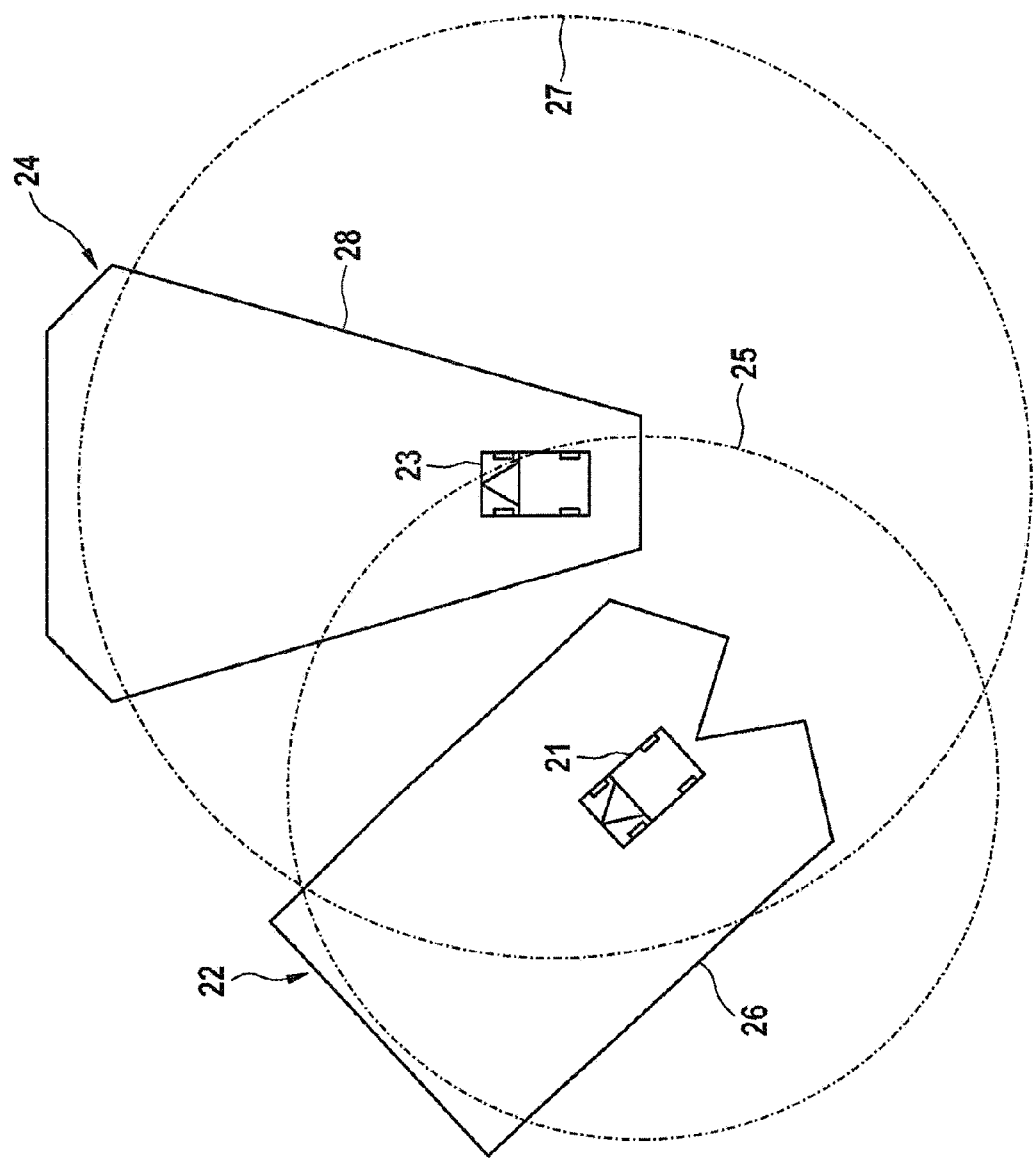
FIG. 2 shows by way of example an originator having an originator region, and a recipient having a recipient region.

FIG. 2 shows by way of example originator 21 having an originator region 22, and recipient 23 having a recipient region 24. Originator 21 and recipient 23 are each motor vehicles, which communicate using vehicle-to-X communication systems and exchange vehicle-to-X messages. Here recipient 23 performs the method according to the invention. Originator region 22 has been determined once as an originator circle 25 and once as an originator polygon 26. Originator polygon 26 has seven sides, because originator 21 is traveling relatively slowly and has a relatively high yaw rate. Recipient region 24 has been determined once as a recipient circle 27 and once as a recipient polygon 28. Recipient polygon 28 has six sides, for example, because recipient 23 is traveling relatively fast and has a relatively low yaw rate. Both originator circle 25 and originator polygon 26, and recipient circle 27 and recipient polygon 28 have been determined by the recipient 23 in a Cartesian coordinate system, the origin of which coincides with the location of recipient 23. As is evident, there is an overlap between originator circle 25 and recipient circle 27, which has resulted, for example, in recipient 23 being unable to classify the vehicle-to-X messages received from originator 21 as irrelevant, but having to analyze said messages further. Accordingly, recipient 23 has subsequently determined originator polygon 26 and recipient polygon 28. Since originator polygon 26 and recipient polygon 28 do not overlap, recipient 23 classifies the vehicle-to-X messages received from originator 21 as relevant but not critical.

The invention claimed is:
1. A method for classifying a received vehicle-to-X message, the method comprising:
    receiving, by a recipient vehicle, the vehicle-to-X message transmitted by an originator vehicle, wherein the vehicle-to-X message contains information of the originator vehicle;

determining, by the recipient vehicle, information of the recipient vehicle;

determining, by the recipient vehicle, a first originator region around the originator vehicle from information received from the originator vehicle;

determining, by the recipient vehicle, a first recipient region around the recipient vehicle from the information of the recipient vehicle;

when the first originator region does not overlap the first recipient region, classifying, by the recipient vehicle, the vehicle-to-X message as a first classification; and when the first originator region overlaps the first recipient region:

determining, by the recipient vehicle, a second originator region around the originator vehicle and a second recipient region around the recipient vehicle, and classifying, by the recipient vehicle, the vehicle-to-X message as a second classification when the second originator region overlaps the second recipient region.

2. The method as claimed in claim 1, wherein the first information comprises a position, an orientation and a velocity.

3. The method as claimed in claim 2, wherein the first information of the originator is read by a network layer of a vehicle-to-x communication system of the recipient.

4. The method as claimed in claim 1, wherein the first information of the originator is read by a network layer of a vehicle-to-X communication system of the recipient.

5. The method as claimed in claim 1, wherein second information of the originator is calculated from the first information of the originator, and second information of the recipient is calculated from the first information of the recipient and/or second information of the recipient is determined using sensors.

6. The method as claimed in claim 5, wherein the second information of the originator is additionally used to determine the originator region, and/or the second information of the recipient is additionally used to determine the recipient region.

7. The method as claimed in claim 1, wherein the second information comprises at least one of a yaw rate, a yaw acceleration, and a linear acceleration.

8. The method as claimed in claim 1, wherein the respective positions of the originator and the recipient are converted into a Cartesian coordinate system, wherein the position of the recipient forms the origin of the coordinate system, and wherein the originator region and the recipient region are determined in the Cartesian coordinate system.

9. The method as claimed in claim 1, wherein for the purpose of determining the originator region, first an originator path starting from the position of the originator is calculated, and for the purpose of determining the recipient region, first a recipient path starting from the position of the recipient is calculated.

10. The method as claimed in, claim 9, wherein for the purpose of determining the originator region, the originator path is rotated through an originator rotation angle, where the originator rotation angle is calculated from the yaw rate and the yaw acceleration of the originator and from the time interval, and for the purpose of determining the recipient region, the recipient path is rotated through a recipient rotation angle, where the recipient rotation angle is calculated from the yaw rate and the yaw acceleration of the recipient and from the time interval.

11. The method as claimed in claim 9, wherein for the purpose of determining the originator region, an originator circle is placed over the originator path, the diameter of which circle equals the originator path, and for the purpose of determining the recipient region, a recipient circle is placed over the recipient path, the diameter of which circle equals the recipient path.

12. The method as claimed in claim 11, wherein a check is made for an overlap between the originator circle and the recipient circle.

13. The method as claimed in claim 12, wherein if the originator circle overlaps the recipient circle, the originator region is defined more precisely by an originator polygon and the recipient region is defined more precisely by a recipient polygon, wherein a number of sides of the originator polygon is selected on the basis of the yaw rate of the originator, and wherein a number of sides of the recipient polygon is selected on the basis of the yaw rate of the recipient.

14. The method as claimed in claim 1, wherein an order of processing of the received vehicle-to-X messages depends on the classification of said messages.

15. A method for classifying a received vehicle-to-X message, wherein the vehicle-to-X message is transmitted by an originator and is received by a recipient performing the classification, wherein the vehicle-to-X message contains first information of the originator, and wherein first information of the recipient is determined using sensors, the method comprising:

determining an originator region from the first information of the originator, and determining a recipient region from the first information of the recipient, wherein the classification is determined on the basis of an overlap of the originator region with the recipient region, and wherein an absolute value of the yaw rate of the originator is used to determine the originator region, and/or an absolute value of the yaw rate of the recipient is used to determine the recipient region.

16. A method for classifying a received vehicle-to-X message, wherein the vehicle-to-X message is transmitted by an originator and is received by a recipient performing the classification, wherein the vehicle-to-X message contains first information of the originator, and wherein first information of the recipient is determined using sensors, the method comprising:

determining an originator region from the first information of the originator, and determining a recipient region from the first information of the recipient, wherein the classification is determined on the basis of an overlap of the originator region with the recipient region, wherein for the purpose of determining the originator region, first an originator path starting from the position of the originator is calculated, and for the purpose of determining the recipient region, first a recipient path starting from the position of the recipient is calculated, and wherein the originator path is calculated from the first and/or second information of the originator for a time interval, and the recipient path is calculated from the first and/or second information of the recipient for the time interval, wherein additionally at least one of i) a time error in the first information of the originator, ii) a detection error in the first information of the recipient and iii) a calculation uncertainty in the second information of the originator and/or of the recipient is taken into account.

17. The method as claimed in claim 16, wherein the first calculation uncertainty is calculated from the time interval, the velocity and the acceleration.

18. The method as claimed claim 16, wherein different originator regions and different recipient regions are determined on the basis of different time intervals.

19. The method as claimed in claim 18, wherein at least two different time intervals are used as classification thresholds, and the classification is made at least into three categories.

* * * * *